United States Patent [19]

Gotanda

[11] 3,854,109

[45] Dec. 10, 1974

[54] DETECTING ELEMENTS OF EXTERNAL FORCE

[76] Inventor: Motohiro Gotanda, 3-6-29 Inakashira, Tokyo, Japan

[22] Filed: July 27, 1973

[21] Appl. No.: 383,156

[52] U.S. Cl. .............................. 335/207, 335/306
[51] Int. Cl. ............................................ H01h 36/00
[58] Field of Search..................... 335/207, 303, 306

[56] References Cited
UNITED STATES PATENTS
3,173,066    3/1965    Roode............................... 335/303

Primary Examiner—R. N. Envall, Jr.
Attorney, Agent, or Firm—Larson, Taylor & Hinds

[57] ABSTRACT

Detecting elements of external force consisting of two actuators having magnetic poles at either one or both end surfaces of the actuators located in opposite. The two actuators have opposite electric contacts at the end surfaces and are pivotally connected to each other through a toggle joint of an electric insulating material. External force exerted on the actuators causes the actuators to move and connect or disconnect the contacts in the actuators. The detecting elements can detect the external force applied to the actuators by connection or disconnection of these electric contacts.

14 Claims, 14 Drawing Figures

PATENTED DEC 10 1974 3,854,109

DETECTING ELEMENTS OF EXTERNAL FORCE

This invention relates to detecting elements of external force which can detect external force with high sensitivity.

The detecting elements of the invention in particular comprises two units of actuators having magnetic poles at either one or both end surfaces of the actuators with an end surface of one actuator in opposite to an end surface of other actuator. At either one or both of the end surfaces of the actuators are provided toggle means formed of an electric insulating material and being capable to pivotally move relative to each other. Electric contacts also are provided at either one or both of the end surfaces of the actuators. The detecting elements of the invention which consist of such actuators in assemblage become electrically conductive when external force is not applied to the elements or they are electrically disconnected. When a force is applied from the outside, the actuators will turn through the medium of a toggle means formed of an electric insulating material, then between two actuators the electrical contact is set ON or OFF instantly. Electric contact or noncontact are thus detected by the detecting elements as separately provided. By this means, it quite is possible for the detecting elements to easily detect the external force on the actuators.

BACKGROUND OF THE INVENTION

A number of detecting elements have been proposed which can easily detect the force applied to apparatus or equipment. Most detecting means unexceptionally include switch means through connection or disconnection of which a force exerted on an actuating means of a switch is detected with efficiency. As a means for connecting or disconnecting a contact of a switch, many conventional devices have been used. However, in most cases, it is required to provide high accuracy to contact means and thereby increase sensitivity of the means if it is necessary to sense even slight external force. As a consequence, the switch means become complicated in construction or it becomes large in size. Another disadvantage is high price consequent on such mechanism and size as well as cost of maintenance of switch means resulting from corrosion or other defects after installation of the switch means. Therefore, it is not desirable to use the conventional switch as described when one utilizes switch means for the prevention crimes as by means of alarm.

For the prevention of crimes, it is first necessary to have such means rather smaller in size so that it may not be readily detected by intruders and second the means may be provided with good sensitivity of contact as well as high reliability. Hitherto, such reliable means have not been obtained to satisfy the requirement as above described.

BRIEF SUMMARY OF THE INVENTION

According to the present invention, the detecting elements for the detection of external force include two actuators each having magnetic poles at either one or both end surfaces of the actuators, which end surfaces are arranged in opposite and each end surface may have toggle joint formed of an insulating material with the actuators connected through the toggle joint to each other and on these end surfaces are disposed electric contacts in opposite locations. The detecting elements including these two actuators in combination become electrically conducting to each other when an external force is not provided or it is electrically diconnected when external force is applied, and the actuators are moved by the pivotal action of the toggle means between the two actuators. Corresponding to the action of external force, the actuators are set ON or OFF in conductance in an instant.

A primary object of the invention is therefore to provide external force detecting elements of simple and reasonable construction which can surely and easily detect a force applied from outside.

Another object of the invention is to provide detecting elements which can preferably be designed so as to variously adapt to the size of external force applied to the detecting elements.

Another object of the invention is to provide external force detecting elements which when external force is detected can move back automatically to the position before detection.

Another object of the invention is to provide external force detecting elements which can easily and surely detect the external force applied to the detecting elements even if such force is extremely small.

Another object of the invention is to provide external force detecting elements adapted for the prevention of crimes particularly for intruders from outside.

Still another object of the invention is to provide external force detecting elements sure and reliable in operation for the prevention of crimes, which can be installed out of heed or sight of intruders.

These and other objects and advantages of the invention can be obtained by use of the elements and mechanism which constitute the present invention and serve for the operation thereof, the invention being described in more detail with reference to the accompanying drawings. It is to be noted that any change or modification in the detailed parts of the specification may be comprised in the claims.

REFERENCE TO THE DRAWINGS

DETAILED DESCRIPTION OF THE INVENTION

Figure 1:
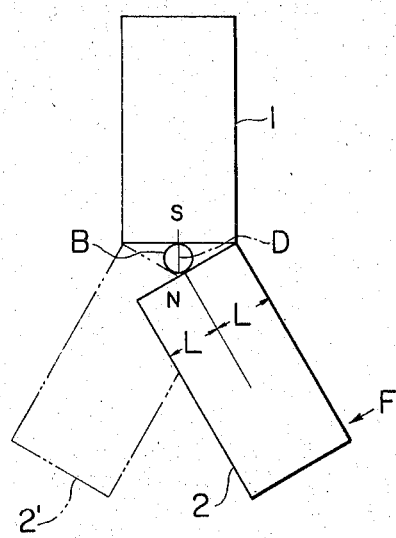
FIG. 1 is a view illustrating the principle of the detecting elements according to the invention.

In FIG. 1 is shown the principle of external force detecting elements according to the invention. Two units of actuators 1 and 2 are formed in a rectangular shape from an electric conductive material. Magnetic poles N and S are respectively formed at the end surfaces in opposite of the actuators.

In the middle between these two actuators is mounted a bar B formed of an insulating material serving as a toggle joint for pivotally moving the actuators 1 and 2.

Normally, either one of the actuators 1 and 2 are attracted to the side of a stronger magnetic force with one end in contact to the other as shown in FIG. 1.

Now, assume that a diameter of the bar B is D and half of the length of a shorter side of the actuator is L. Here, it is provided that an external force F is acted on the actuator 2 from the direction of the arrow. When L is constant, the external force F must be large so much as D to an extent that may move the actuator 2 to a position of 2' as shown by dotted lines. So much as D is small, though the external force F is small, the actuator 2 is moved. If D is provided constant, the actuator 2 is moved by small external force F so large as L. So much small as L is, a larger external force F is required to move the actuator 2.

Utilizing this principle, it is then possible to design a mechanism of various size providing D, L and magnetic force with adequate magnitude corresponding to the amount of external force as predetermined.

In one embodiment of the invention, such mechanism may have a bar B of a diameter so small as a hair. The bar B is fixed to the actuator with a bonding agent to be used for sensitively receive a very small external force.

Figure 2:
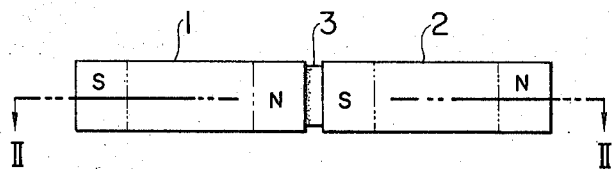
FIG. 2 is an enlarged plan view of an embodiment of the detecting elements according to the invention.
Figure 3:
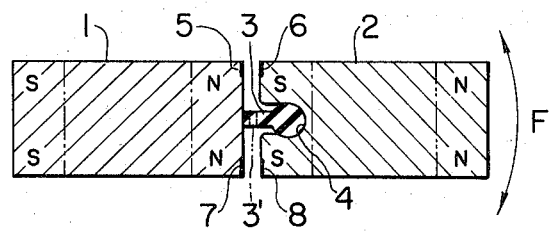
FIG. 3 is a cross section taken along the line II—II of FIG. 2.
Figure 4:
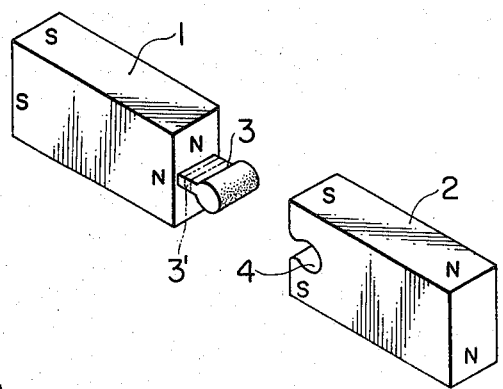
FIG. 4 is a perspective view of two actuators of the detecting elements of the invention.

FIG. 2 is a plan view of an embodiment of the detecting elements of this invention. FIG. 3 is a front view in cross section taken along the line II—II of FIG. 2. In the figure, two actuators 1 and 2 are formed of an electric conductive material of a rectangular shape, the end surfaces of which are provided N and S poles thereon respectively. In this embodiment shown in FIGS. 3 and 4, one of the actuators is provided with a projection 3 of an electric insulating material. The insulating material does not constitute the whole body of the projection 3 but it only forms a portion 3', the remaining part being formed of a conductive material. Other actuator 2 may enclose the end of the projection 3 and has a recess 4 by which the projection 3 can freely turn round in the direction of the arrow of FIG. 3. In this way, a projection 3 of the actuator 1 and a recess 4 of the actuator 2 can form a toggle joint in use of a toggle means.

Again, as shown in FIG. 3, the two actuators 1 and 2 are formed at the end surfaces electric contacts 5, 7 and 6, 8 and they are not needed particular electric contacts thereon, because the actuators are made of conductive material. However it is preferable to provide silver contact particularly when electric current must flow in a much more amount.

Figure 5:
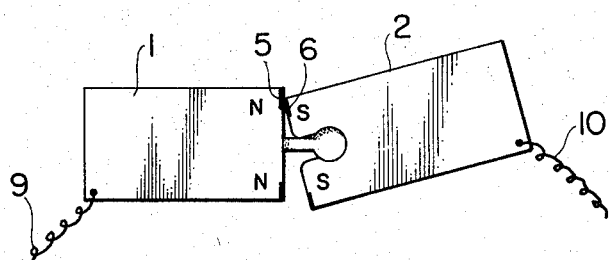
FIGS. 5 and 6 are views respectively illustrating the operation of the detecting elements of FIG. 2.
Figure 6:
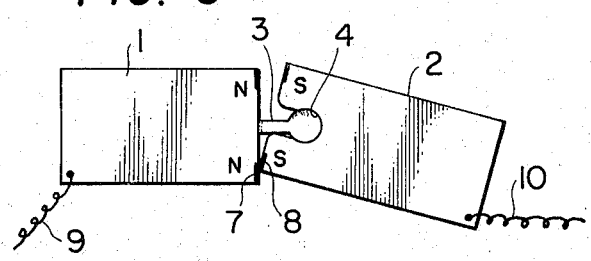

Operation of the detecting elements will be described. The actuators 1 and 2 are connected by means of the projection and recess 4 as above described. In normal time when no external force is acted, the detecting elements take the condition of FIG. 5, in which contacts 5 and 6 of the two actuators are connected, or the condition of FIG. 6, where contacts 7 and 8 of the two actuators are connected.

Thus, either one of the two actuators is attracted to a side much stronger in magnetic force inclining to that side and remains stable with contacts 5, 6 or 7, 8 being closed. As the actuators 1 and 2 are formed of electric conductive material as above described, conductance is provided between lead wires 9 and 10.

When external force F is applied in the detecting elements in this condition in the direction of the arrow as shown in FIG. 3, attraction of the actuator is reversed through the toggle joint. For instance, a detecting element is turned suddenly from the position of FIG. 5 to that of FIG. 6 or reversely from the position of FIG. 6 to that of FIG. 5.

At the instant of reverse turning, the actuators 1 and 2 are surely cut off conductance.

By use of a phenomenon producing such condition in the detecting elements, the action of external force can be easily detected by connection of other electric detecting devices or means (not shown) to the detecting elements.

Figure 7:
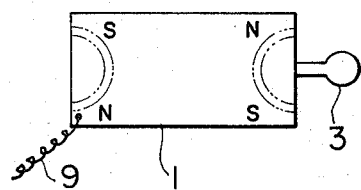
FIG. 7 is a front view of other embodiment of the actuators of the detecting elements of the invention.

Preferably, both positive and negative magnetic poles N and S may be magnetized for each end surface as shown in FIG. 7. The actuators 1 and 2 also may not only be made of magnetic steel but the body of the actuator may be formed of electric conductive material such as mild steel, and magnetic pole pieces of electric conductive nature may be attached to both ends of the actuator.

Preferably, the actuators 1 and 2 may be made of ferrite magnet, the pertinent portions at the end surface or peripheral surface may be partly coated with electric conductive material such as copper. Such actuators 1 and 2 of ferrite magnet may be provided with contacts 5, 6, 7 and 8 at the end surfaces with lead wires 9 and 10 and their contacts made conductive.

If preferred, one actuator only may be magnetized and other actuator may be made of a magnetic body.

Figure 8:
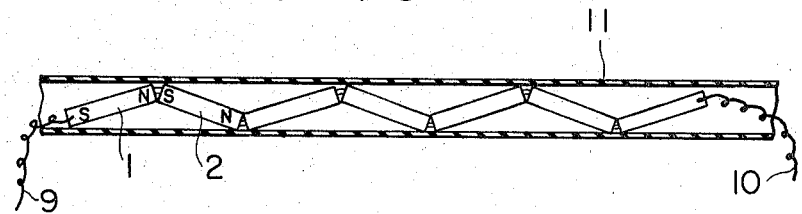
FIG. 8 is a view showing an example of the detecting elements contained in a tube.
Figure 9:
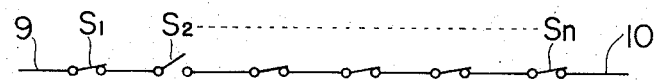
FIG. 9 shows an equivalent circuit of a device of FIG. 8.

FIG. 8 shows another embodiment of the detecting elements of this invention. The elements consist of actuators 1 and 2 of serial connection and are contained in a flexible pipe 11 such as vinyl tube as shown in cross section. In this embodiment, the detecting elements provide a condition as shown when external force is not applied so that the lead wires 9 and 10 become conducting. As the external force is acted and the flexible pipe 11 is deformed, either actuator turns reversely through the toggle means and the turned actuator surely takes an OFF position because anyone or any plurality of switches $S_1 - S_n$ in the equivalent circuit of FIG. 9 are instantly disconnected (for instance, $S_2$ as shown), whereby the elements can sensitively detect the external force applied in the flexible pipe.

Such elements can be contained in a curtain or screen at the window of a house or suspended taking a certain form from a window. As it is so concealed that the curtain or screen may be kept out of heed or sight of the intruder. When the intruder touches upon the curtain or screen, the action of touching can be detected directly. This detecting action of the elements causes an alarm circuit connected to the elements operate to issue an alarm. The toggle means of this invention may include a hinge type or other modified type may be used such as a rod-like projection 3 having a ball at its end and a recess 4 for receiving such a ball.

Even though each actuator may not surely turn reversely or may not be attracted, it turns OFF by external force and if it is attracted to an initial position, the circuit will take the original condition.

According to the detecting elements of this invention, the circuit automatically returns to the original condition. It is not necessary to turn the circuit back to the initial condition.

The detecting elements of this embodiment essentially consist of two actuators, but if the elements just consist of two actuators, the magnetic pole may be provided only at the end surface of one of the two actuators.

Throughout the above embodiments, the magnetic poles are provided at the end surfaces of the two actuators such that actuators of opposite poles may be attracted to each other, while actuators of same poles may be provided in opposite thereby repelling against each other. In this way, the detecting elements may be obtained in such a way that normally contacts of two actuators are disconnected but when external force is applied such contacts are disconnected.

Figure 10:
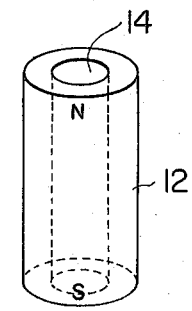
FIG. 10 is a view showing other embodiment of the actuator.

FIG. 10 shows another embodiment of the actuator which is the actuator 12 of a cylindrical shape.

Though it is different from that of FIG. 2, each actuator in this case, may have the same size and construction. The actuator 12 of the cylindrical shape is formed with magnetic poles N and S at respective end surfaces as shown in FIG. 10.

Figure 11:
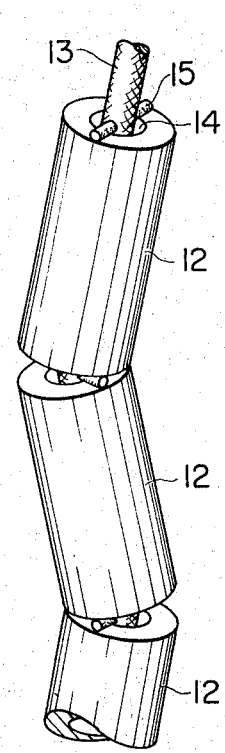
FIG. 11 is an example of the detecting elements using the actuators of FIG. 10.

Such actuator 12 may be inserted into a cord-like flexible body 13 having a long hole 14 passing through the middle of the actuator 12 as shown in FIG. 11. Between the actuators 12 is interposed an insulating bar-like body 15.

In this embodiment, the bar-like body 15 serves for the action of a pivot in a toggle mechanism. The bar-like body 15 is secured to the flexible body 13 such that it may not be movable and it is disposed with an angle 90° alternately formed in every other positions.

With the construction as above described, the actuators 12 in plurality and in serial connection can apply all weight in the flexible body 13 but not in each actuator so that any actuator exerted an external force can operate in the same way as other actuators.

The bar-like body 15 is disposed in various directions with an angle 90°, therefore any change in the direction of external force does not affect the accuracy of detection.

In the device of FIG. 11, the flexible body 13 is formed of an insulating material. A conductor is arranged to pass through the flexible body 13 to be taken out from the actuator 12 at the lowest stage and connected to the lowest stage. It is possible to obtain the detecting elements which are not exposed to the outside of the device and therefore quite easy for use.

Figure 12:
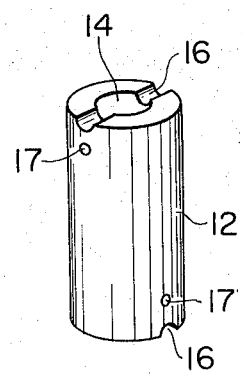
FIGS. 12 and 13 are views respectively showing the modifications of the actuator of FIG. 10.
Figure 13:
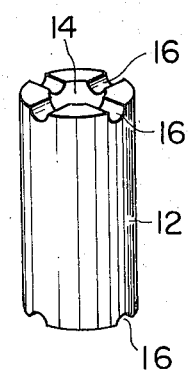

FIG. 12 shows the actuator 12 of FIG. 10, at the end surface of which is provided a recess 16 to stabilize the position of the bar-like body 15. Preferably, the recess 16 may be formed in a cross shape as shown in FIG. 13. Numeral 17 of FIG. 12 designates a pass hole for soldering a lead wire to the actuator 12.

Figure 14:
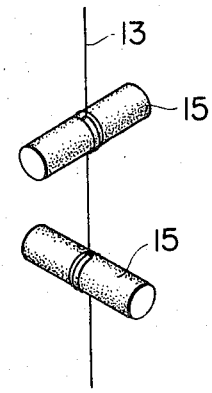
FIG. 14 is a view illustrating a method of fixing the bar-like body and flexible body of FIG. 10.

FIG. 14 shows a method of fixing a bar-like body 15 to a narrow flexible body 13. In this figure, the bar-like body 15 is fastened with an interval to the flexible body 13.

Though not shown, the bar-like body 15 may be fixed by passing the flexible body 13 through the bar-like body 15. The device of the present embodiment, which are shown in FIGS. 8 and 11, may be suspended from windows or they may be assembled into carpets or sofas, or laid in mats at the entrance of a room out of heed or sight of the intruder. When the intruder carelessly touches the device, a force caused from touching of the detecting elements may be detected so effectively. The detecting elements of the invention are thus adapted for many objects well serving for the prevention of crimes.

What I claim is:

1. An external force detecting device for sensing the entry of an intruder or the like, said device comprising at least first and second actuator members, said axially aligned actuator members being oppositely disposed and including magnetic poles at the end surfaces thereof; electrically conductive contacts located on said end surfaces of said actuator members which, when in engagement with the electrically conductive contacts of another actuator member, complete an electrical circuit through said contacts, contacts of said first and second actuator members being normally held in engagement with one another by magnetic forces generated by said magnetic poles; and means, including electrical insulating means, disposed between said first and second actuator members, for providing a pivot about which said actuator members can rotate such that an external force applied to a said actuator member can cause breaking of the engagement between said electrically conductive contacts and hence breaking of the electrical circuit completed thereby.

2. An external force detecting device as claimed in claim 1 wherein said actuator members each include magnetic poles of unlike polarity at opposite end surfaces thereof.

3. An external force detecting device as claimed in claim 1 wherein the adjacent end surfaces of said first and second actuator members are of opposite polarity.

4. An external force detecting device as claimed in claim 1 wherein one of said first and second actuator members includes a recess therein and the other of said first and second actuator members includes a projection which extends into said recess, said recess and projection constituting said pivot providing means.

5. An external force detecting device as claimed in claim 1 wherein at least three of said actuator members are connected together in serial relationship.

6. An external force detecting device as claimed in claim 5 further comprising a flexible tube in which said serially connected actuator members are located.

7. An external force detecting device as claimed in claim 6 wherein said flexible tube is constructed of a vinyl material.

8. An external force detecting device as claimed in claim 1 wherein said actuator members are substantially rectangular in shape.

9. An external force detecting device as claimed in claim 1 wherein said actuator members each include magnetic poles of like polarity at the end surfaces thereof so that said actuator members repel each other.

10. An external force detecting device comprising at least three elongate actuator members arranged in serial relationship, each said actuator member including contact means and a first magnetic pole at one end thereof and a second magnetic pole at the other end thereof, and a plurality of insulating bars; a said insulating bar being disposed between the end surfaces of adjacent actuator members and said insulating bars being arranged so that each said bar forms a 90° angle with the said bar disposed between the end surfaces of the next two actuator members in the series, said actuator members each including a longitudinal bore therein and said force detecting device further including a flexible member which extends through each of said bores in said actuator members so as to connect said actuator members in serial relationship.

11. A device as claimed in claim 10 wherein said bars extend transversely to said flexible member.

12. A device as claimed in claim 10 wherein said actuator members are cylindrical in shape.

13. An external force detecting device comprising at least first and second actuator members including contact means through which an electrical circuit can be completed, said actuator members each further including at least one magnetic pole for generating magnetic forces which hold said actuator members in a position wherein said electrical circuit can be completed through said contact means, at least one of said actuator members being moved from said position responsive to an external force so as to break the connection in said electrical circuit provided by said contact means, said actuator members being pivotably mounted with respect to one another so as to provide two said positions wherein said electrical circuit can be completed through said contact means and said electrical circuit being broken when a said actuator member moves from one of said two positions to the other of said two positions.

14. An external force detecting device for sensing the entry of an intruder of the like, said device comprising at least first and second axially aligned actuator members, said actuator members being oppositely disposed and including magnetic poles at the end surfaces thereof; electrically conductive contacts located on said end surfaces of said actuator members which, when in engagement with the electrically conductive contacts of another actuator member, complete an electrical circuit through said contacts, contacts of said first and second actuator members being normally held out of engagement with one another by magnetic forces generated by said magnetic poles; and means, including electrical insulating means, disposed between said first and second actuator members, for providing a pivot about which said actuator members can rotate such that an external force applied to a said actuator member can cause engagement between said electrically conductive contacts and hence completion of the electrical circuit therethrough.

* * * * *